(12) United States Patent
Schmid et al.

(10) Patent No.: US 9,359,122 B2
(45) Date of Patent: Jun. 7, 2016

(54) DISCHARGING SYSTEM

(75) Inventors: Christoph Schmid, Maisach OT. Gernlinden (DE); Thomas Daum, Munich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/238,866

(22) PCT Filed: Aug. 15, 2012

(86) PCT No.: PCT/EP2012/065964
§ 371 (c)(1),
(2), (4) Date: May 28, 2014

(87) PCT Pub. No.: WO2013/024122
PCT Pub. Date: Feb. 21, 2013

(65) Prior Publication Data
US 2014/0252025 A1    Sep. 11, 2014

(30) Foreign Application Priority Data
Aug. 17, 2011   (DE) .......................... 10 2011 081 137

(51) Int. Cl.
*B67D 7/22* (2010.01)
*B65D 83/00* (2006.01)
(Continued)

(52) U.S. Cl.
CPC ........ *B65D 83/0005* (2013.01); *B05C 11/1002* (2013.01); *B05C 17/0103* (2013.01); *G01F 22/00* (2013.01)

(58) Field of Classification Search
CPC .................. B05C 17/00553; B05C 17/00665; B05C 17/00559; B05C 17/00566; B05C 17/00593; B05C 17/0103; B05C 11/1002; G01F 22/00; B65D 83/0005

USPC .................. 222/41, 137, 133, 134, 626, 333, 222/251–255, 52, 55, 57, 63; 604/131, 151, 604/152, 154, 156
See application file for complete search history.

(56) References Cited

U.S. PATENT DOCUMENTS 4,874,368 A * 10/1989 Miller et al. .................... 604/82
5,328,459 A *  7/1994 Laghi .............................. 604/35
(Continued)

FOREIGN PATENT DOCUMENTS

EP   0236129 A2   9/1987
EP   1516679 A2   3/2005

OTHER PUBLICATIONS

International Search Report for International Patent Application No. PCT/EP2012/065964 dated Jan. 30, 2013.

*Primary Examiner* — Lien Ngo
(74) *Attorney, Agent, or Firm* — James E. Piotrowski (57) ABSTRACT

A discharging system (100, 200, 300, 400, 500) for discharging liquid to pasty compounds (107, 207, 30, 507) out of cavities (106, 206, 306, 506) of at least two containers (105, 205, 305, 405, 405', 505), comprising a delivery end (109, 209, 309, 409, 509) at which the compounds (107, 207, 307, 507) are discharged; a receiving unit (101, 201, 301, 401, 401', 501) for at least two containers (105, 205, 305, 405, 405', 505) comprising the cavities (106, 206, 306, 506) filled with the compounds (107, 207, 307, 507) to be discharged; for each container, a respective advancing rod (103, 203, 303, 403, 403', 503) with a pusher element (104, 204, 304, 504) provided on that side of the advancing rod (103, 203, 303, 403, 403', 503) facing toward the delivery end (109, 209, 309, 409, 509); for each container, a respective advancing device for advancing the advancing rod (103, 203, 303, 403, 403', 503), with the pusher element (104, 204, 304, 504), toward the delivery end (109, 209, 309, 409, 509) in order to discharge the compounds; for each container, a respective means for determining the volume of respectively discharged compound (107, 207, 307, 507).

12 Claims, 5 Drawing Sheets

(51) Int. Cl.
  *B05C 17/01*  (2006.01)
  *B05C 11/10*  (2006.01)
  *G01F 22/00*  (2006.01)

(56) References Cited

U.S. PATENT DOCUMENTS

| | | | | |
|---|---|---|---|---|
| 5,376,079 | A * | 12/1994 | Holm | 604/191 |
| 5,423,752 | A * | 6/1995 | Haber et al. | 604/86 |
| 5,524,797 | A * | 6/1996 | Schultz, Sr. | 222/334 |
| 6,423,035 | B1 * | 7/2002 | Das et al. | 604/155 |
| 6,682,601 | B1 * | 1/2004 | Beebe | 118/679 |
| 6,723,067 | B2 * | 4/2004 | Nielson | 604/82 |
| 6,889,872 | B2 * | 5/2005 | Herman et al. | 222/82 |
| 6,932,237 | B2 * | 8/2005 | Heymann et al. | 222/1 |
| 7,100,804 | B2 | 9/2006 | Heiberger | |
| 7,347,837 | B2 * | 3/2008 | Azzolini | 604/154 |
| 7,507,221 | B2 * | 3/2009 | Neer | 604/151 |
| 7,959,612 | B2 * | 6/2011 | Thompson et al. | 604/191 |
| 2002/0025267 | A1 * | 2/2002 | Lieber et al. | 417/572 |
| 2003/0080152 | A1 | 5/2003 | Balcome et al. | |
| 2004/0152979 | A1 * | 8/2004 | Sakakibara et al. | 600/432 |
| 2009/0250491 | A1 | 10/2009 | Erman et al. | |
| 2010/0282774 | A1 * | 11/2010 | Greter et al. | 222/39 |

* cited by examiner

DISCHARGING SYSTEM

The invention relates to a discharging system for discharging liquid to pasty compounds out of containers. Such systems have been known for some time in the existing art, and are employed in particular as fluid delivery systems for discharging adhesives or sealants at manual workstations in repair shops, laboratories, and industrial facilities.

EP 1087842 B1 presents a fluid delivery system for discharging fluids such as epoxy resins, silicones, adhesives. The fluid delivery system comprises a control unit that is connected via a control cord to a manual applicator. The manual applicator is equipped with a motor that engages into a drive rod. The drive rod is inserted into an assembly made up of a cartridge and piston for applying the fluid to be dispensed. The drive rod is configured so that it engages via a screw thread on the piston in the conventional cartridge-and-piston assembly. A control device for controlling the advance of the drive rod is also provided. For discharge of a specific quantity of fluid, a calculation is made of the time required by the drive rod for a specific advance movement from a starting point. The drive rod is then moved for that time in order to discharge that quantity. This can result in errors, however, for example because the aforesaid starting point is incorrectly set, thus resulting in inaccuracies in the volume of fluid discharged.

The object of the invention is therefore to provide an improved apparatus for discharging liquid or viscous materials.

This object is achieved by the features of claim 1.

Advantageous embodiments of the invention are described by the dependent claims.

The basic idea of the invention is to employ a discharging system for discharging liquid to pasty masses, or also fluids, out of cavities of at least two containers, wherein the discharging system comprises a delivery end at which the compounds are discharged; a receiving unit for at least two containers comprising the cavities filled with the compounds to be discharged; for each of the containers, a respective advancing rod with a pusher element provided on that side of the advancing rod facing toward the delivery end; for each of the containers, a respective advancing device for advancing the advancing rod, with the pusher element, toward the delivery end in order to discharge the compounds; for each of the containers, a respective means for determining the volume of the respectively discharged compound. A combination container, for example, such as a double cartridge, can of course also alternatively be used, as well as a corresponding receiving capability for that combination holder.

An essential advantage is use of the means for determining the volume of discharged compound. Use of such a means can make possible volumetric metering of the compound, which ensures application of an exact quantity of compound. In particular, viscosity differences between various compounds, for example as a result of temperature changes or after a container change, have no influence, or at most a small influence, on the discharged quantity, since metering can occur volumetrically. Thanks to the use of a suitable indicating means, such as a display or a scale, the metered quantity of discharged compound can moreover be exactly monitored. Said means is preferably embodied in such a way that it requires no contact with the compound to be discharged, in particular in order to avoid contamination of the means with the compound and to ensure a long period of functionality. A further advantage is therefore the configuration of the means for sensing the volume in such a way that the latter enables a determination of the volume of discharged compound without touching or contacting the compound.

The discharging system can be configured as a manually guidable and/or portable system. Such systems are sufficiently known in the existing art, for example as cartridge guns or tubular-pouch guns. Preferably, however, the system is configured as a fluid delivery system for exact discharge of adhesives or sealants, in particular of epoxy resins, silicones, adhesives, in particular anaerobic, UV-curing, and gel cyanoacrylate adhesives, as well as chip bonders and soldering pastes. The discharging system is utilized preferably for automated application of the compound, in particular with the aid of an industrial robot. Other areas of utilization are, in particular, at manual workstations in repair shops, laboratories, and industrial facilities. The metering rate of a discharging system according to the present invention is preferably in the range from 0.02 ml/min to 1 ml/min, preferably in a range from 0.04 ml/min to 0.5 ml/min. A particularly preferred metering rate is approximately 0.05 ml/min. The quantity metered for each part is in the preferred range from 0.02 g to 0.1 g, particularly preferably is 0.05 g. The discharging system is preferably configured in such a way that containers having a capacity in the range from 10 ml to 1000 ml can be used, particularly preferably in the range from 200 ml to 800 ml.

The containers used comprise, as stated previously, a cavity in which the compound to be discharged is located. The containers are preferably configured in such a way that the cross-sectional area of the cavity is constant in the longitudinal extension of the container. Particularly preferably, the shape and the dimensions of the cross section of the cavity are constant in the longitudinal extension. Hollow-cylindrical containers having a constant diameter, in particular inside diameter, are conceivable in particular. Cartridges known in the existing art can be employed, for example, as containers for the compound to be discharged. A suitable cartridge comprises, for example, a solid outer casing, in particular having a round, rectangular, or polygonal cross section, that surrounds the aforesaid cavity for receiving the compound to be discharged. A hollow-cylindrical container is preferably employed. The cartridge can have, at the distal end, a nozzle shape having a discharge opening. Said cavity is usually closed off at the proximal end by a piston that terminates sealingly with the inner wall of the casing and is shiftable inside the cavity for discharge of the compound. In this case the receiving unit can be configured in such a way that only containers having specific outside dimensions can be received. Also conceivable, however, are designs in which containers of any shape and dimension can be received.

Flexible containers, in particular film cartridges or tubular pouches, can of course also be used, a particular configuration of the receiving unit being advantageous in that case. For example, utilization of a substantially closed receiving unit, or one that is closable after insertion of an aforesaid flexible container, can prove useful, said unit preferably having a delivery opening for discharging the compound only at the delivery end. Film cartridges or tubular pouches of this kind can comprise a thin-walled casing that can be made in particular of a film or composite film. That casing surrounds said cavity in which the compound is contained. The casings can be closed off at both ends in the manner of a sausage tail. In order for such a container to be used, it must be opened at one end, in particular by being pierced or cut.

For discharge of the compound out of the container, the advancing rod is equipped with a pusher element, the latter being provided on that side of the advancing rod facing toward the delivery end. The advancing rod is preferably configured as a compressively loadable rod having any cross section, in particular having a round, polygonal, or rectangular cross section. The advancing rod can moreover be solid or hollow. It is also conceivable to equip the advancing rod with advancing means, including in particular the use of a tooth set on the entire surface, or on parts of the surface, of the advancing rod. In an embodiment of the invention, provision is furthermore made that the advancing rod is configured as a spindle in order to enable advancing by way of a corresponding advancing device. Said pusher element of the advancing rod can preferably be a piston that is fixedly connected to the advancing rod. Alternatively, the pusher element can also be made available by the distal end region, i.e. the region facing toward the delivery end, of the advancing rod.

A suitable advancing device for advancing the advancing rod can be, in particular, a linear motor, a stepping motor, or another advancing device known to one skilled in the art, in particular one operated electrically, pneumatically, or hydraulically. Also conceivable are entirely mechanically actuatable advancing devices, for example those employed for commercially usual cartridge guns.

The use of a receiving capability for at least two containers, in particular made up of two or more receiving units for at least two containers, has proven to be a particular advantage of the invention, in order to enable simultaneous discharge of multiple compounds, in particular multi-component compounds; one advancing unit and one advancing rod are provided for discharging the compounds for each container, as well as one means each for determining the volume of each discharged compound. The advancing units and/or advancing rods are preferably decoupled, i.e. movable mutually independently, so that compound can be discharged out of each container independently of a further container or the further containers. The discharge of compound out of each container is determined by a respective means for determining the volume. Each of these means is preferably configured in such a way that the volume can be determined without touching or contacting the compound with the means. Said means can in particular comprise the above-described first and second means and can be configured as described. This type of configuration of a discharging system allows volumetric metering of multiple, in particular multi-component compounds out of multiple containers, in particular out of commercially usual double cartridges, to be made available. Because a means is made available that enables a determination of volume without touching or contacting the compound, exact sensing of the discharged volume can be made available without contact with the compound, which might, for example, contaminate any measuring apparatuses of the means. With the use of a means described above, in particular the use of said first and second means, no mechanically moved parts in the compound or in contact with the compound are needed, for example spindles, pistons, or gears, as is the case with commercially usual and conventional flow-through measuring systems. Said decoupling can moreover make possible, in particular with multi-component compounds, independent monitoring of the metering rate and mixing ratio of the components. In particular, metering deviations or deviations in the mixing ratio, resulting for example from clogged lines or mixers, leaks, or wear, can be immediately detected.

It has moreover proven advantageous, in the context of this use according to the present invention of the discharging system to discharge two or more compounds, if the delivery system comprises a metering system for the compounds to be discharged, which system is provided at the delivery end of the discharging system or is attached as an additional unit to the delivery end. A metering system of this kind can be, in particular in the context of two-component compounds, a double-piston pump metering unit, a double-screw pump metering unit, or any other volumetric two-component metering unit.

In an advantageous refinement of the invention, said means for determining the volume of discharged compound is configured in such a way that it comprises a first means for determining the cross-sectional area of the cavity containing the compound, as well as a second means for determining the advance displacement of the advancing rod, in order to enable a determination of the volume of discharged compound. The volume of discharged compound can easily be determined from the values sensed, in order to ensure exact metering of the compound. It is conceivable here, for example, to use a scale for volume indication and a read-off mark as further aids to the user for directly sensing the volume, wherein one of the aforesaid aids is connected to the advancing rod and wherein the scale can be manually calibrated to the cross-sectional area, sensed or identified by way of the means for determining the cross-sectional area, of the cavity. The connection between the scale or read-off mark and the advancing rod is preferably configured in such a way that upon an advance of the advancing rod, associated with a discharge of compound, a shift of the read-off mark relative to the scale occurs. The user can thus read off the discharged volume directly on the scale by means of the read-off mark. Alternatively, the means for sensing the cross-sectional area and advance displacement, or at least one of said means, can comprise electrical measuring devices that can be connected to a monitoring device by way of which, upon an advance of the advancing rod, the volume to be discharged can be displayed directly. Said first means in particular can be configured as an active or passive means. A "passive" means is to be understood here as a means that does not measure the cross-sectional area actively, but instead is configured, for example, in such a way that only containers comprising cavities having specific, and in particular previously defined, cavities can be utilized. The active means, in contrast thereto, preferably contains apparatuses for actively sensing, in particular for measuring the cross-sectional area of the cavity. The latter means are suitable in particular for discharging systems that can be used flexibly with containers of different sizes.

In an embodiment of the invention, provision is furthermore made that the pusher element of the advancing rod makes available the first means, in this case therefore as a passive means, for sensing the cross-sectional area of the cavity containing the compound, wherein the pusher element is configured in a piston shape in order to define the cross-sectional area of a preferred container to be placed into the receiving unit.

A configuration of this kind of the first means is employed in particular when cartridges described above are used as containers. The pusher element here is of a size such that only cartridges comprising a cavity having a specific cross-sectional area can be employed. One conceivable solution, for example, is one in which on the one hand cartridges having cavities with too small a cross-sectional area cannot be used because the pusher element has a larger diameter and therefore cannot be introduced into the cavity in order to discharge compound. Secondly, the pusher element can in particular be adapted to the above-described piston arranged inside the cavity, so that a discharge of compound out of cartridges having cavities having overly large cross-sectional areas can also not be used without problems. In an advantageous refinement, the first means can be made available on the one hand by the pusher element, in particular in order to prevent the discharge of compound out of containers comprising cavities having overly small cross-sectional areas. On the other hand, the receiving unit can additionally be configured in such a way that containers comprising cavities having overly large cross-sectional areas do not fit into, or cannot securely be received in, said receiving unit. In this context an above-described passive means containing the pusher element and the receiving element would exist. It is possible in this manner to ensure in particular that a discharge of compound is possible only out of containers comprising cavities having defined and predetermined cross-sectional areas. An aforementioned solution is analogously possible when above-described flexible containers are used, in particular as a result of suitable configuration of the receiving unit, for example as a fixed hollow cylinder into which the flexible container is placed, as well as a pusher element inside the receiving unit.

Alternatively or additionally, it has proven to be advantageous that the receiving unit makes available the first means, here again an above-described passive means for sensing the cross-sectional area of the cavity, wherein the receiving unit has a configuration such that only containers of a preferred cross-sectional area are receivable and/or a discharge of compound is possible only with containers of a preferred cross-sectional area. Solutions in which secure reception and/or fastening is guaranteed only for containers, for example cartridges, whose cavity has a predetermined and/or defined cross-sectional area, are conceivable here. A configuration of the receiving unit in such a way that the container is clamped or snapped in between two oppositely located clamping jaws engaging laterally on the container sides is particularly conceivable. Containers comprising cavities having overly large cross-sectional areas therefore cannot be received because of their dimension. Containers comprising cavities having overly small cross-sectional areas could be inserted in this case, but would fall through the opening between the oppositely located clamping jaws because of the overly small cross-sectional area. A solution of this kind for flexible containers using corresponding receiving units is also analogously possible. In this case, for example when using a hollow-cylindrical receiving unit and an above-described tubular pouch as container, containers comprising a cavity having too large a cross-sectional area do not fit into the receiving unit, and containers comprising a cavity having too small a cross-sectional area are compressed by the pusher element in such a way that a discharge of compound is possible only once the cavity of the receiving unit has been completely filled up.

It has proven to be particularly advantageous, however, to use a first means that is constituted by the combination of a receiving unit and pusher element. First means of this kind, constituting passive means as described above, preferably do not allow a determination of the cross-sectional area in the sense of a measurement, but do enable a determination of the cross-sectional area in the sense of a definition, so that cross-sectional areas not provided for cannot be utilized.

Alternatively to the aforesaid passive means, the use of an active means for sensing the cross-sectional area of the cavity can also prove useful. Conceivable here in particular are noncontact measuring apparatuses, for example ultrasonic distance measuring apparatuses, which sense the cross-sectional area or at least sense measured values from which the cross-sectional area can be calculated, in particular, with the aid of a monitoring device. Also conceivable are other measuring apparatuses, in particular pivoting apparatuses mounted on the advancing rod, which conform to the inner wall of a container after introduction of the piston rod; this can result in a change in angle between the advancing rod and pivoting apparatus, from which the cross-sectional area can in turn be calculated. Also conceivable is the use of further measuring apparatuses known to one skilled in the art for actively sensing the cross-sectional area of the cavity.

A further advantage is the use of a second means for determining the advance displacement of the advancing rod, which means comprises a displacement measuring system in order to determine the advance displacement of the advancing rod. Displacement measuring systems of this kind are measuring systems that measure the length of a distance that has been traveled. Displacement measuring systems are commonly known in the existing art; such displacement measuring systems are used in particular in factory automation or process automation as support for contact-type or noncontact measuring or positioning tasks. One simple embodiment of a displacement measuring system of this kind would be an indication of the advance displacement by means of a scale and read-off mark. As described above, this indication could be adapted, for containers having defined cross-sectional areas, to said containers so that not only the advance displacement but also the volume of discharged compound (identified from the sensed advance displacement and the defined cross-sectional area) can be displayed, for example, via the scale. A further possibility would be to make available a manual displacement measuring system of this kind comprising a scale for advance displacement indication and/or for volume indication, the scale ideally being adaptable, for the latter indication, to different cross-sectional areas.

The use of more-complex and, in particular, electrically operated displacement measuring systems is of course also conceivable. A displacement measuring system that is employed can, in particular, comprise an analog or digital sensing of measured values, i.e. sensing of the advance displacement; analog displacement measuring systems supply a continuous signal, and digital displacement measuring systems supply a signal that changes in steps. Inductive displacement measuring systems, or alternatively also magnetostrictive displacement measuring systems, are also usable in particular. The preferred resolution of a displacement measuring system that is employed is in the range from 0.005 mm to 0.1 mm, particularly preferably is 0.01 mm. Especially exact metering of the compound can be enabled in particular with a displacement measuring system of this kind.

A further advantage is utilization of a measuring rod as part of the second means for determining the advance displacement of the advancing rod, wherein an advance of the advancing rod results in a movement of the measuring rod. For example, the measuring rod can be connected to the advancing rod in such a way that a movement of the advancing rod results in a movement of the measuring rod. Alternatively, the measuring rod can also be embodied as part of the advancing rod. Utilization of a measuring rod that moves with the advancing rod allows sensing of the advance displacement of the advancing rod to be enabled without contact between the second means and the compound to be discharged.

A parallel arrangement of the measuring rod with respect to the advancing rod has furthermore emerged as advantageous. The measuring rod is preferably connected via a yoke-shaped connecting element to the advancing rod in order to ensure a movement of the measuring rod upon an advance of the advancing rod. A configuration of this kind allows a discharging system having small dimensions to be made available, since the measuring rod and advancing rod are arranged parallel to one another.

A further advantage is the use of a means for sensing the force acting via the advancing rod on the pusher element in order to discharge the compound. In a particularly preferred case a force sensor is employed as a means. It is conceivable, for example, for the advancing rod to be of hollow configuration, a feeler rod for sensing the force acting on the pusher element being provided in the cavity. Force transfer to the pusher element occurs here preferably exclusively via the feeler rod. Provision can, however, additionally be made that force transfer also occurs via the advancing rod itself. The feeler rod can be operatively connected to the force sensor in such a way that sensing of the force acting on the pusher element can be enabled by the force sensor. Preferably the force sensor is connected fixedly to the advancing rod or is fastened with regard to the latter at least in the shifting direction of the advancing rod, for example on that side of the advancing rod which is opposite in terms of the pusher element, and moves with the advancing rod upon a motion of the latter. For connection, a sensor mount that is fixedly connected to the advancing rod can additionally be provided.

With such a means, or with a similar means, for sensing the force acting on the pusher element, a capability can be made available for sensing and measuring data which can be connected to or correlated with the compound in the container or the container itself. In particular, clogs and similar malfunctions at discharge openings, mixers, or nozzles can thereby be quickly detected.

A further advantage is the utilization of a discharging system wherein the means for determining the volume of discharged compound comprises on the one hand said second means for determining the advance displacement of the advancing rod comprising a measuring system for determining the advance displacement, in particular a displacement measuring system as described. On the other hand, the means for determining the volume comprises a monitoring unit to which the measuring system is connected, in particular electrically connected, wherein the measuring system comprises a capability for inputting the cross-sectional area of a container being used, in order to calculate the volume of discharged compound.

A further advantage is utilization of a metering system for the compounds to be discharged, which system is provided at the delivery end of the discharging system or is attached as an additional unit to the delivery end.

It has furthermore proven advantageous to employ a means for sensing the force, acting via the advancing rod on the pusher element, for discharging the compound.

The invention will be described by way of example below with individual exemplifying embodiments and with pertinent Figures, in which.

Figure 1:
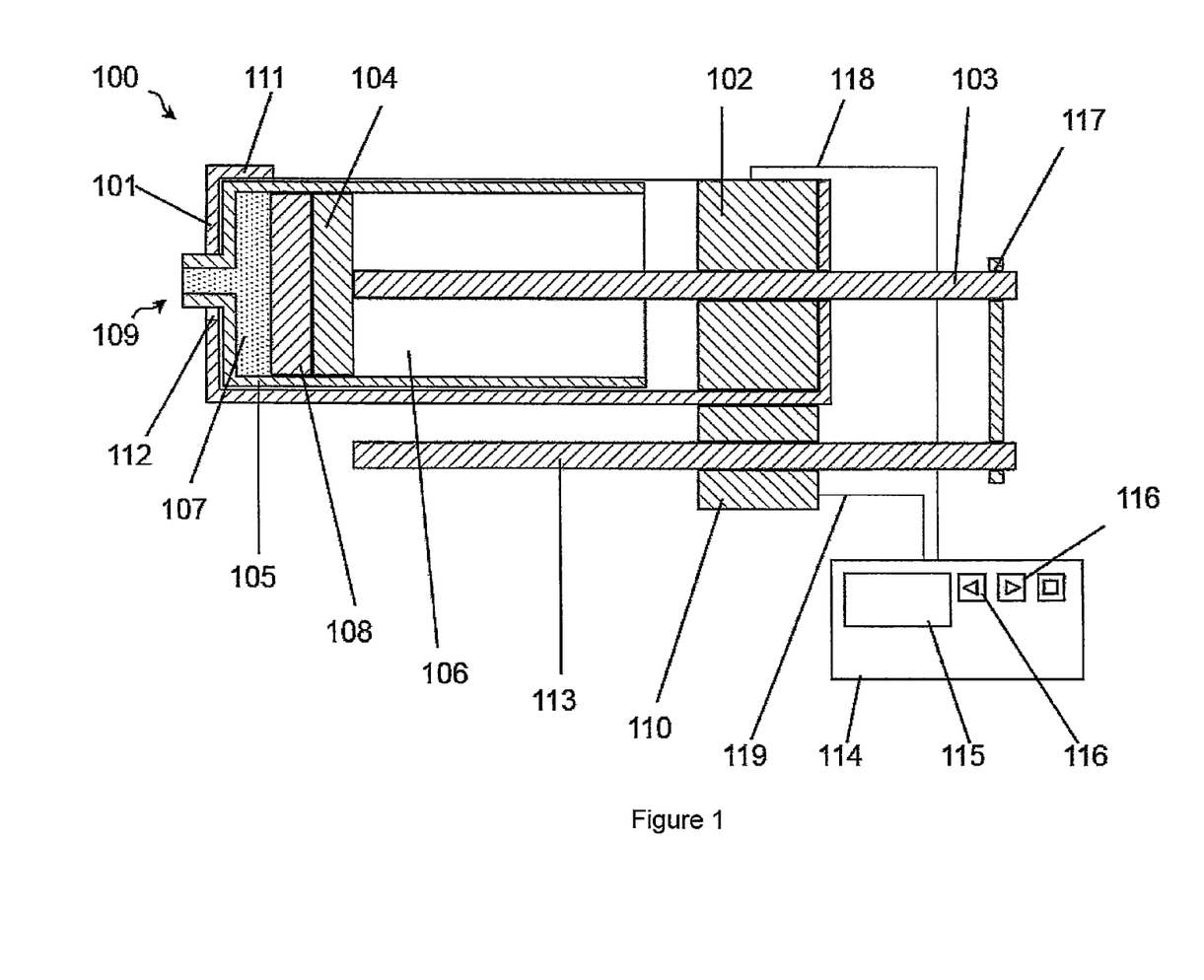
FIG. 1 is a schematic, sectioned side view of a discharging system according to the present invention.

FIG. 1 is a sectioned side view of a discharging system 100 according to the present invention. Discharging system 100 is employed as a fluid delivery system for exact discharge of a compound 107, for example of an adhesive or sealant, in particular of an epoxy resin; of a silicone; of an anaerobic, UV-curing, or gel cyanoacrylate adhesive; of a chip bonder; or of a soldering paste. Discharging system 100 is used preferably for automated application of compound 107, in particular with the aid of an industrial robot. Other areas of application also exist, however, at manual workstations in repair shops, laboratories, and industrial facilities. The metering rate of discharging system 100 shown is in the range from 0.02 ml/min to 1 ml/min, particularly preferably in a range from 0.04 ml/min to 0.5 ml/min. A particularly preferred metering rate is approximately 0.05 ml/min. The quantity metered per part is in the preferred range from 0.02 g to 0.1 g, particularly preferably is 0.05 g. Discharging system 100 comprises a receiving unit 101 which can receive a cartridge 105 that contains compound 107 and in the present exemplifying embodiment is hollow-cylindrical. In the exemplifying embodiment shown, receiving unit 101 is configured, in particular by means of stop 111 projecting in the upper region, in such a way that only cartridges 105 up to a specific outside diameter can be received. Cartridge 105 locally surrounds, with a solid plastic jacket, a cavity 106 in which compound 107 is contained. The cavity is furthermore closed off at one end by a cartridge piston 108 that terminates sealingly with the inner wall of said jacket and that is configured shiftably with respect to the axis of cartridge 105 in order to discharge compound 107 out of a delivery opening at the opposite end of cartridge 105. The delivery opening of cartridge 105 projects out, with a protruding connector piece, through a discharge opening 112 at a delivery end 109 of discharging system 100 (the distal end of receiving unit 101). At said connector piece, for example, a nozzle (not shown) or a hose connection can be connected to cartridge 105.

In order to discharge compound 107, discharging system 100 moreover comprises an advancing unit that comprises a pusher element in the form of a piston 104 that is of cylindrical configuration, wherein the diameter of piston 104 corresponds substantially to the inside diameter of cartridge 105. In order to discharge compound 107 at delivery end 109, piston 104 is shifted with respect to the axis of cartridge 105 toward delivery end 109, and pushes cartridge piston 108 toward delivery end 109. The advancing unit furthermore contains for this purpose an advancing rod in the form of a piston rod 103 that is fixedly connected to piston 104 at its end opposite from delivery end 109, as well as a linear motor 102 as an advancing device for advancing piston rod 103, with piston 104, toward delivery end 109. In the exemplifying embodiment shown, piston rod 103 comprises a force sensor (not illustrated) that can sense the force acting via piston rod 103 on piston 104. Malfunctions such as clogs can, in particular, be rapidly detected with the aid of the force sensor.

Also provided, parallel to piston rod 103, is a measuring rod 113 that is connected to piston rod 103 via a connecting yoke 117 in such a way that an advance movement of piston rod 103 results in an advance movement of measuring rod 113. Measuring rod 113 serves to sense the advance displacement of piston rod 103, and together with a displacement measuring unit 110 constitutes a means for determining or sensing said advance displacement. In the present exemplifying embodiment, a magnetostrictive measuring system is employed as displacement measuring unit 110. Measuring systems or displacement measuring systems of this kind are sufficiently known in the existing art. Measuring system 110 has a preferred resolution in the range from 0.001 mm to 0.1 mm, particularly preferably a resolution of 0.01 mm. Said means for determining the advance displacement serves for or aids in sensing the volume of discharged compound 107. Displacement measuring unit 110 is connected for this purpose, via an electrical connection 119, to a monitoring unit 114 that comprises not only a controller or microcontroller (not shown) for open- and closed-loop control of processes, but also a display 115 as well as various function keys 116 in particular for controlling linear motor 102, the latter being connected via an electrical lead 118 to monitoring unit 114.

In the exemplifying embodiment depicted, the inside diameter of the hollow-cylindrical cartridge 105, as well as the cross-sectional area of cavity 106, are defined by the shape of receiving unit 101 and by the conformation of piston 104. Only cartridges 105 having a specific inside diameter and a specific enveloping wall thickness can thus be placed into receiving unit 101 in order to enable discharge of compound 107. Piston 104 and receiving unit 101 thus interactively constitute a definition means or safety means in order to ensure that only cartridges 105 having the stipulated and defined cross-sectional area are used. Receiving unit 101, in the present case together with piston 104, thus constitutes in particular a passive means for passively sensing the cross-sectional area of cavity 106, wherein (as described above) receiving unit 101 has a conformation such that only cartridges 105 having cavities 106 with a specific cross-sectional area are receivable, and a discharge of compound 107 is possible only out of cartridges 105 having cavities 106 with a specific cross-sectional area.

Also conceivable, of course, alternatively to this combined means made available by way of piston 104 and receiving unit 101, are solutions in which only piston 104 makes available said means for sensing the cross-sectional area of cavity 106, the latter preferably being of piston-shaped configuration in order to define the cross-sectional area of cavity 106 of a container to be placed into the receiving unit. A variant thereof would be a solution in which exclusively receiving unit 101 provides the means for sensing the cross-sectional area of cavity 106, wherein receiving unit 101 has a conformation such that only cartridges 105 having cavities 106 with a specific cross-sectional area are receivable, and/or a discharge of compound 107 is possible only out of cartridges 105 having cavities 106 with a specific cross-sectional area.

In an embodiment that is not depicted, the means for determining the volume of discharged compound 107 can furthermore be, for example, the illustrated means for determining the advance displacement of piston rod 103, wherein said monitoring unit 114 comprises, as a means for sensing the cross-sectional area of cavity 106, a capability for inputting the cross-sectional area of cartridge 105 being used, in order to calculate the volume of compound 107 discharged.

Said preferred and defined cross-sectional area of cavity 106 is moreover stored in the controller of monitoring unit 114, so that together with the advance displacement identified via displacement measuring unit 110, the controller can calculate the volume of discharged compound 107. That volume can be indicated via display 115. Monitoring unit 114 furthermore contains a capability for adjusting, via function keys 116, volumes of compound to be discharged, as well as manual discharge control. Because displacement measuring unit 110 is made available in combination with a conformation such that only cartridges 105 comprising cavities 106 having defined cross-sectional areas can be employed, and by means of monitoring unit 114 which captures data regarding the sensed advance displacement and in which information regarding said cross-sectional area are stored, a means for determining and indicating the volume of discharged compound 107 can be provided. In practice, firstly a manual advance of piston 104 preferably occurs until compound 107 is discharged, for example, via an attached nozzle or another application tool (not shown). This initial discharge preferably occurs not onto the workpiece that is to be provided with compound 107. The actual discharge, whose volume can be sensed via the above-described means, occurs subsequently.

For this, monitoring unit 114 can contain a reset function by means of function keys 116 in order to reset the indication on the display.

The exemplifying embodiment shown thus makes possible true volumetric metering of compounds 107 out of commercially usual cartridges 105. In contrast to the existing art, what exists here is not a disadvantageous pressure/time system. In addition, the particular conformation makes possible an exact flow-through measurement with no contact between compound 107 and components necessary for measurement, which might possibly become contaminated. In particular, additional moving parts in compound 107, in particular mechanically moving parts such as spindles or gears as in the case of commercially usual flow-through measuring systems, are avoided.

Figure 2:
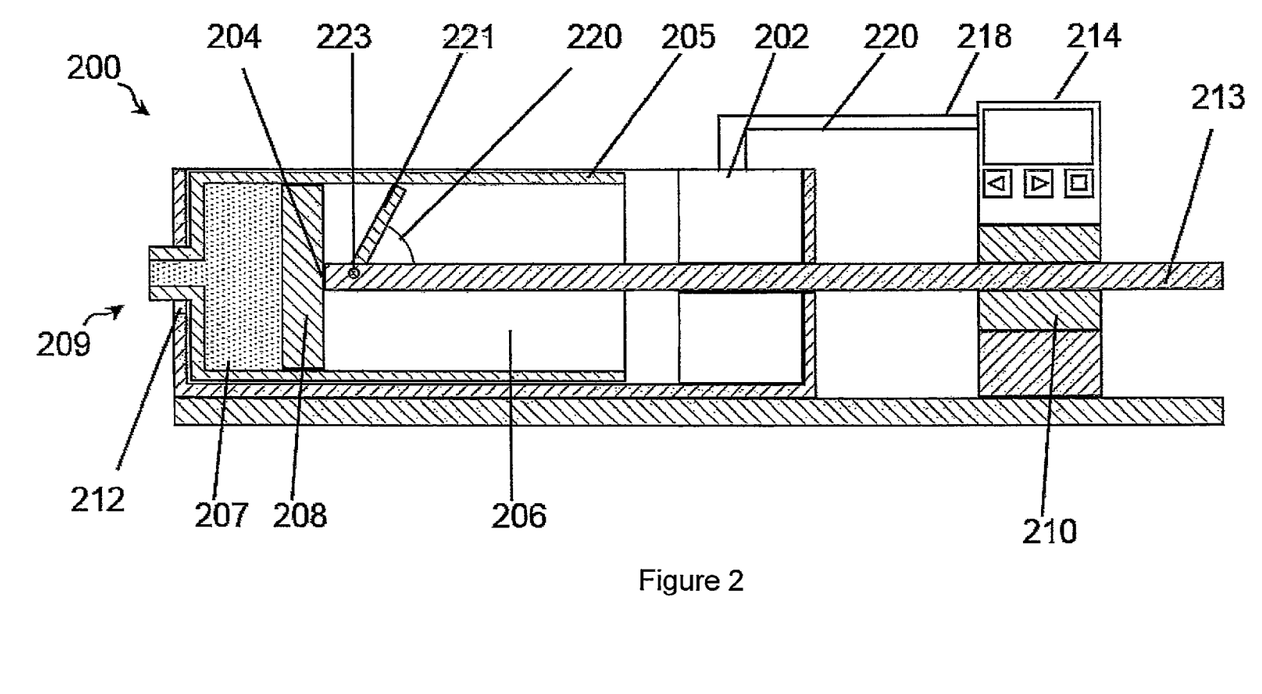
FIG. 2 is a schematic, sectioned side view of an alternative discharging system according to the present invention.

FIG. 2 is a schematic, sectioned side view of an alternative discharging system 200 according to the present invention having a construction similar to discharging system 100 shown in FIG. 1. The present discharging system 200 comprises a receiving unit 201 for receiving a hollow-cylindrical cartridge 205 comprising a cavity 206, filled with compound 207, having a cartridge piston 208. Compound 207 is discharged by shifting cartridge piston 208 with respect to the cartridge axis by means of a piston rod 203 comprising a pusher element 204 that is made available by the distal end of piston rod 203, and a stepping motor 202. In order to sense and determine the cross-sectional area of cavity 206, piston rod 203 comprises a pivot rod 221, wherein in the idle position, i.e. with no cartridge 205 placed into receiving unit 201, the pivot rod projects at a right angle from piston rod 203 under a preload. When a cartridge 205 is placed into receiving unit 101 and piston rod 203 is introduced into cavity 206, pivot rod 221 is pivoted by cartridge 205 around a shaft 223 against said preload until it abuts against the inner wall of cartridge 205. Angle 222 that then exists between the pivoted pivot rod 221 and piston rod 203 is sensed via a digital angle measuring unit (not depicted), the latter being connected via an electrical connection 220 to a monitoring unit 214. The latter calculates, from the sensed angle 222, the cross-sectional area of cavity 206. Stepping motor 202 is moreover connected via an electrical lead 218 to monitoring unit 214 in order to allow the latter to be controlled. Piston rod 203 is equipped, at its end located oppositely with respect to delivery end 209, with a measurement segment 213. A displacement measuring unit 210 is also provided in order to sense the advance displacement of piston rod 203 via measurement segment 213. Displacement measuring unit 210 is also connected to monitoring unit 214, so that the latter can determine, from the identified advance displacement and from the cross-sectional area of cavity 206 calculated from the identified angle 222, the volume of discharged compound. Discharging system 200 depicted here allows the use even of cartridges 205 having different diameters and wall thicknesses, since thanks to the use of pivot rod 221, discharging system 200 possesses an active means for sensing the cross-sectional area of cavity 206. In practice, especially when cartridges 104 having smaller diameters are used, it can prove useful to employ spacing means which are configured in such a way that pusher element 204 pushes on the center point of cartridge piston 208, in particular in order to avoid jamming of cartridge piston 208.

Figure 3:
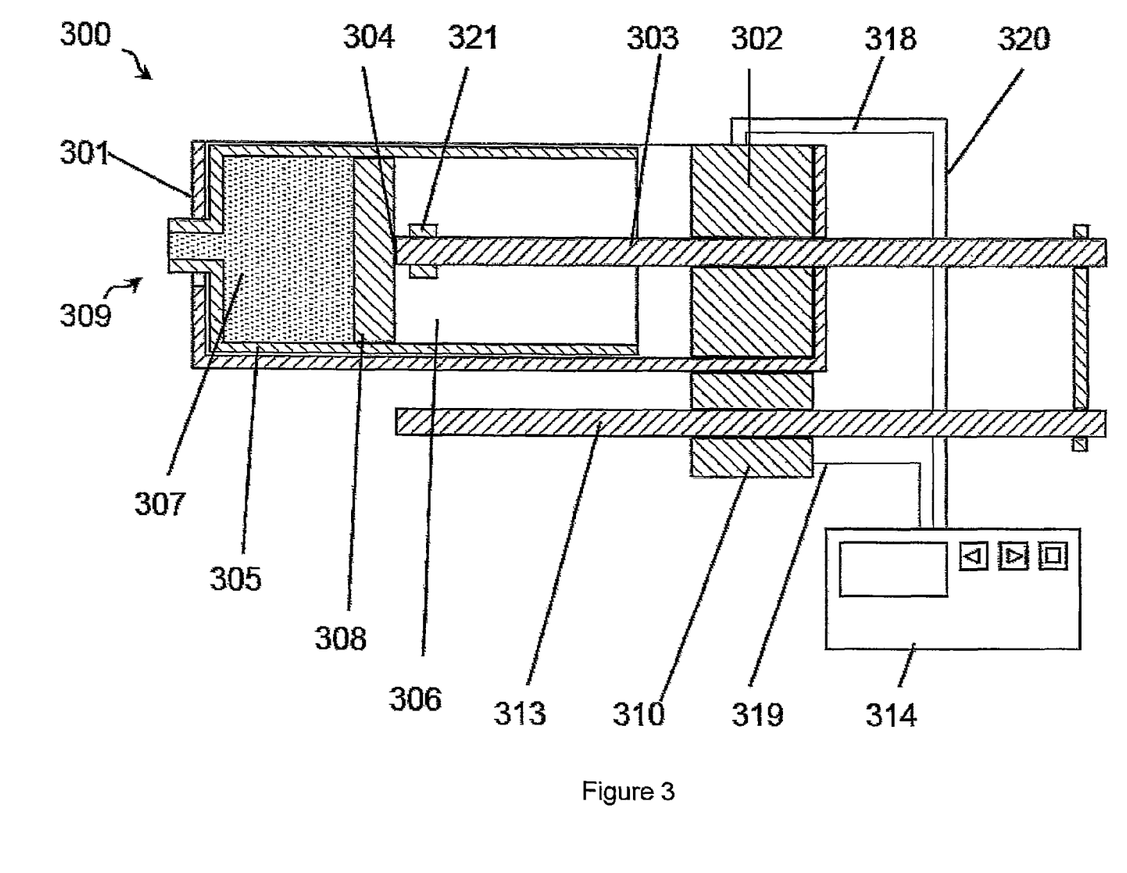
FIG. 3 is a schematic, sectioned side view of a further variant of a discharging system according to the present invention.

FIG. 3 is a schematic, sectioned side view of a further variant of a discharging system 300 according to the present invention having a configuration similar to discharging system 100 shown in FIG. 1. Discharging system 300 depicted here differs only in having a differently configured receiving unit 301 that permits the use of different cartridges 305 comprising cavities 306, containing a compound 307, having different cross-sectional areas. Similarly to the exemplifying embodiment shown in FIG. 2, discharging system 300 shown here comprises an active means for determining the cross-sectional area of cavity 306. This is made possible by an ultrasonic distance measuring unit 321 arranged on piston rod 303, which unit senses the spacing between piston rod 303 and that inner wall of cartridge 305 which delimits cavity 306. Ultrasonic distance measuring unit 321 is arranged in the immediate vicinity of a pusher region 304 of piston rod 303, wherein pusher region 304 comes into contact with a cartridge piston 308 in order to discharge compound 307. Other alternative measuring systems known to one skilled in the art can of course also be employed here instead of ultrasonic distance measuring unit 321. The cross-sectional area of cavity 306 can be calculated with the aid of monitoring unit 314 connected to ultrasonic distance measuring unit 321. In addition, a displacement measuring unit 310, which senses the advance displacement of piston rod 303 and is likewise connected to monitoring unit 314, is provided here as well. From the data thereby obtained, monitoring unit 314 enables an indication of the volume of discharged compound 307. The remaining components of discharging system 300, in particular linear motor 302, delivery end 309, measuring rod 313, and electrical connections 318, 319, 320, are arranged analogously to the exemplifying embodiment presented in FIG. 1, and reference is therefore made to the description relevant thereto.

Figure 4:
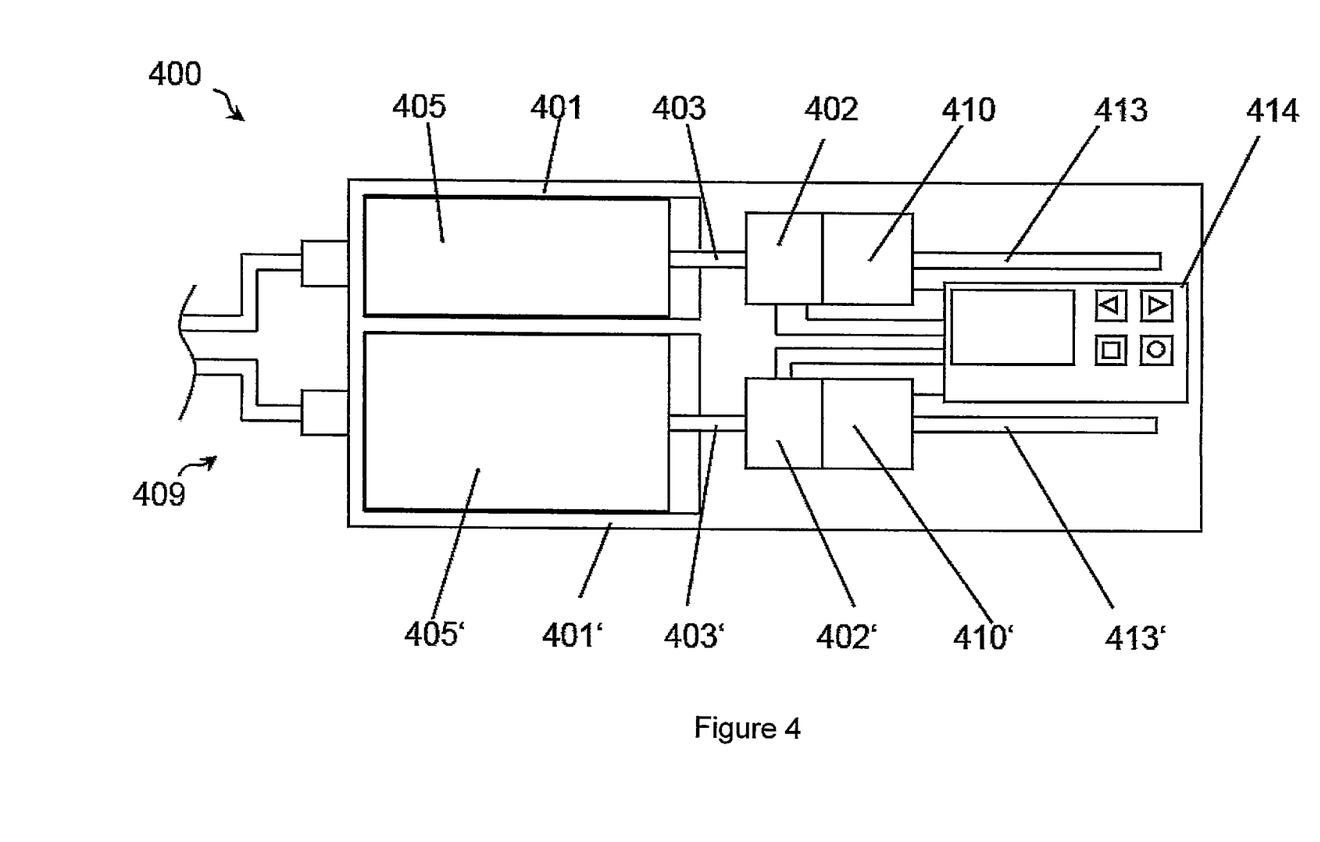
FIG. 4 is a schematic plan view of a discharging system according to the present invention for discharging multiple compounds.

FIG. 4 is a schematic plan view of a discharging system 400 according to the present invention for discharging multiple compounds, here for discharging two components of a two-component adhesive, at a delivery end 409. Discharging system 400 comprises a receiving capability having two receiving units 401, 401' for two containers 405, 405' in order to enable simultaneous discharge of multiple compounds, wherein one respective advancing device 402, 402' and one respective piston rod 403, 403' is provided for each container 405, 405' for discharging the compounds. Alternatively, a receiving capability for a combination container, for example a double cartridge, can of course also be used. The discharging of the individual compounds is decoupled here, i.e. each compound can be discharged independently of the others, and advancing devices 402, 402' are actuatable independently of one another. In addition, a respective means for determining the volume of each discharged compound is provided. The cross-sectional area of containers 405, 405' is determined, as described above, passively by way of a specific shape of receiving units 401, 401' and optionally pistons (not depicted), or actively by the use of a special measuring apparatus, in particular a pivot rod shown in FIG. 2 or an ultrasonic distance measuring unit shown in FIG. 3. Both piston rods 403, 403' have, provided on their ends located oppositely with respect to delivery end 409, a first resp. second measuring region 413, 413' that serve respectively to sense the advance displacement of piston rods 403, 403' via a first resp. second displacement measuring unit 410, 410'. Discharging system 400 depicted here furthermore also comprises a monitoring unit 414 for processing the identified data, for calculating and indicating the volume of discharged compounds, for regulating advancing devices 402, 402', and in particular for regulating correct metering of the two components. A static mixer (not shown) for mixing the two compounds can be installed, for example, directly at delivery end 409. Preferably, however, the two compounds are discharged separately from one another and are conveyed via a respective product hose to a two-component metering unit (not shown), in the present case a double-screw pump metering unit. Said pump metering unit can be made up of two pumps, wherein one pump is provided for each compound and wherein the pumps are arranged in a V-shape with respect to one another in such a way that the outlets of the pumps come together so that, for example, a static mixer can be attached there.

Figure 5:
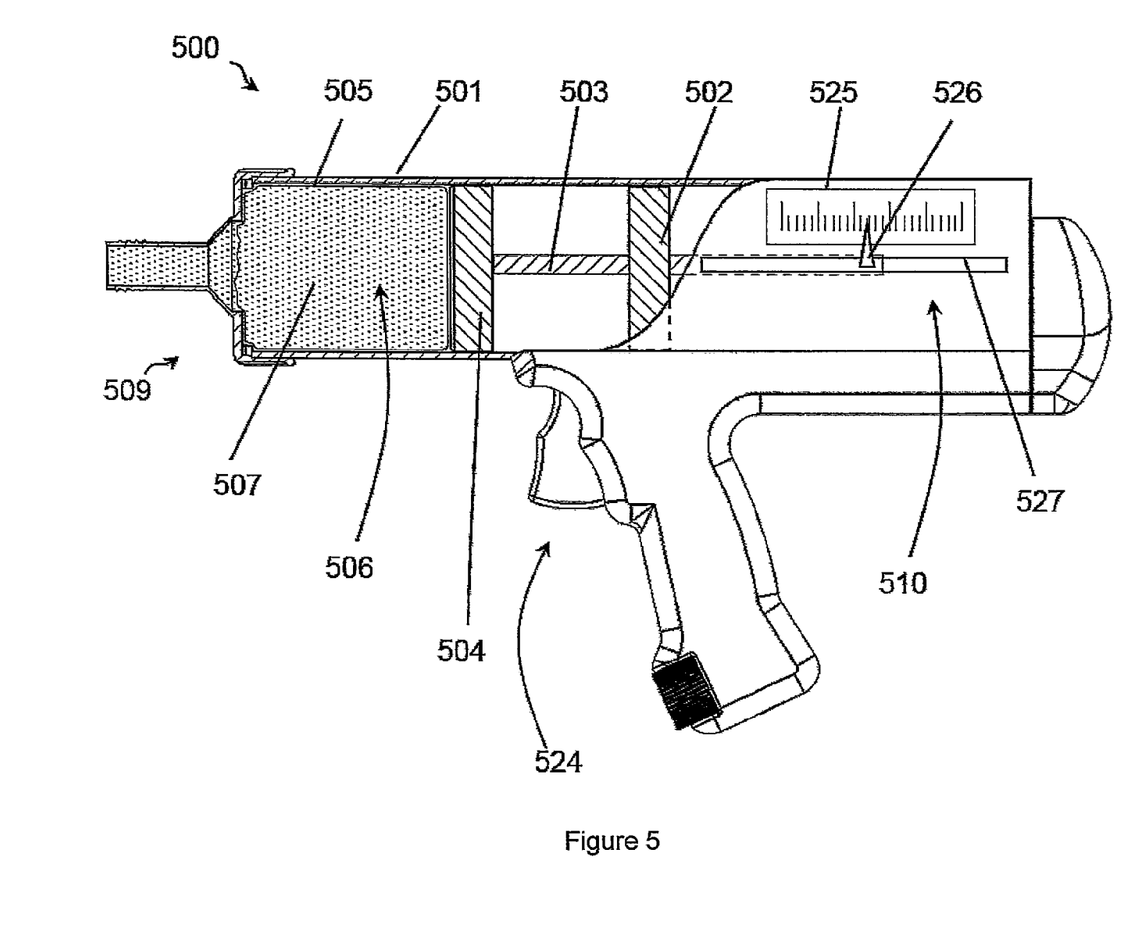
FIG. 5 is a partly sectioned side view of a further variant of a discharging system according to the present invention that is employed as a tubular-pouch gun.

FIG. 5 is a sectioned side view of a further variant of a discharging system according to the present invention that is employed as a tubular-pouch gun 500. The basic function of such tubular-pouch guns 500 is sufficiently known in the existing art. Tubular-pouch gun 500 that is shown comprises a hollow-cylindrical receiving unit 501 that comprises at a front delivery end 509 a removable cover cap having a discharge nozzle. In order to fill tubular-pouch gun 500, said cover cap is detached from receiving unit 501 so that a tubular pouch 505 can be placed into the cavity of receiving unit 501. Tubular pouch 505 surrounds, with a flexible casing made of a composite film, a cavity 506 having compound 507 to be discharged. Before tubular-pouch gun 500 is used and before the cover cap is put in place, the tubular pouch is cut off on the side facing toward delivery end 509.

Tubular-pouch gun 500 furthermore comprises an electrical advancing device 502 with which a piston rod 503, having a piston 504 facing toward delivery end 509, can be shifted inside the receiving unit with respect to the longitudinal axis of receiving unit 501. A metering unit 524 and a rechargeable battery (not illustrated) are provided on the handle of tubular-pouch gun 500 for activation of the advancing device 502. In order to discharge compound, piston 504 is pushed by advancing unit 502 toward delivery end 509, and presses compound 507 out of tubular pouch 505. As a result of the pressure acting on tubular pouch 505, the latter becomes compressed in such a way that it conforms with its casing against the inner wall of receiving unit 501. The cross-sectional area of cavity 506 thus corresponds to the cross-sectional area of receiving unit 501, with a negligible differences that is defined by the casing of tubular pouch 505. A displacement measuring unit 510, which in the present exemplifying embodiment is configured mechanically, is provided at the rear region of piston rod 503. Provided here in the outer wall of receiving unit 501 is a gap 527 through which a mark 526 connected to piston rod 503 projects. A scale 525 for mark 526 is moreover provided on the outer surface of the receiving unit. Scale 525 is configured, and coordinated with the cross-sectional area of receiving unit 501, in such a way that the volume of discharged compound 507 is indicated there. It is thereby possible to make available, with tubular-pouch gun 500 that is shown, a manually actuatable and portable discharging system ensuring volume-metered discharge.

LIST OF REFERENCE CHARACTERS

100 Discharging system
101 Receiving unit
102 Linear motor
103 Piston rod
104 Piston
105 Cartridge
106 Cavity
107 Compound
108 Cartridge piston
109 Delivery end
110 Displacement measuring unit
111 Stop
112 Discharge opening
113 Measuring rod
114 Monitoring unit
115 Display 116 Function keys
117 Connecting yoke
118 Electrical connection
119 Electrical connection
200 Discharging system
201 Receiving unit
202 Stepping motor
203 Piston rod
204 Pusher element
205 Cartridge
206 Cavity
207 Compound
208 Cartridge piston
209 Delivery end
210 Displacement measuring unit
212 Discharge opening
213 Measurement segment
214 Monitoring unit
215 Display
216 Function keys
218 Electrical connection
219 Electrical connection
220 Electrical connection
221 Pivot rod
222 Angle
223 Pivot shaft
300 Discharging system
301 Receiving unit
302 Linear motor
303 Piston rod
304 Pusher region
305 Cartridge
306 Cavity
307 Compound
308 Cartridge piston
309 Delivery end
310 Displacement measuring unit
313 Measuring rod
314 Monitoring unit
318 Electrical connection
319 Electrical connection
320 Electrical connection
321 Ultrasonic distance measuring unit
400 Discharging system
401 First receiving unit
401' Second receiving unit
402 First advancing device
402' Second advancing device
403 First piston rod
403' Second piston rod
405 First cartridge
405' Second cartridge
409 Delivery end
410 First displacement measuring unit
410' Second displacement measuring unit
413 First measuring region
413' Second measuring region
414 Monitoring unit
500 Tubular-pouch gun
501 Receiving unit
502 Advancing device
503 Piston rod
504 Piston
505 Tubular pouch
506 Cavity
507 Sealant
509 Discharge nozzle
510 Displacement measuring unit
524 Metering unit
525 Scale
526 Mark
527 Gap

The invention claimed is:

1. A discharging system for discharging liquid to pasty compounds out of cavities of at least two containers, comprising
a delivery end at which the compounds are discharged,
a receiving unit for at least two containers comprising the cavities filled with the compounds to be discharged,
for each container, a respective advancing rod with a pusher element provided on that side of the advancing rod facing toward the delivery end,
for each container, a respective advancing device for advancing the advancing rod, with the pusher element, toward the delivery end in order to discharge the compounds,
for each container, a respective volume determination unit for determining the volume of respectively discharged compound, each said volume determination unit comprising a first means for determining the cross-sectional area of the cavity containing the compound as well as a second means for determining the advance displacement of the advancing rod, in order to enable a sensing of the volume of discharged compound, the second means comprising a measuring rod, and an advance of the advancing rod results in a movement of the measuring rod.

2. The discharging system according to claim 1, wherein the pusher element of the advancing rod provides the first means for sensing the cross-sectional area of the cavity, wherein the pusher element is piston-shaped in order to define the cross-sectional area of the cavity of a container to be placed into the receiving unit.

3. The discharging system according to claim 1, wherein the receiving unit provides the first means for sensing the cross-sectional area of the cavity, wherein the receiving unit has a configuration such that only containers having cavities having a specific cross-sectional area are receivable, and/or a discharge of compound is possible only from containers having cavities having a specific cross-sectional area.

4. The discharging system according to claim 1, wherein the second means for determining the advance displacement of the advancing rod comprises a displacement measuring system in order to determine the advance displacement of the advancing rod.

5. The discharging system according to claim 1, wherein the measuring rod is arranged parallel to the advancing rod, and is connected to the advancing rod via a yoke-shaped connecting element in order to ensure a movement of the measuring rod upon an advance of the advancing rod.

6. The discharging system according to claim 1, wherein the means for determining the volume of discharged compound comprises the means for determining the advance displacement of the advancing rod having a measuring system for determining the advance displacement, as well as a monitoring unit with which the measuring system is connected, wherein the monitoring unit or the measuring system comprise a capability for inputting the cross-sectional area of the cavity of the container being used, in order to calculate the volume of discharged compound.

7. The discharging system according to claim 1, wherein a metering system for the compounds to be discharged is provided at the delivery end of the discharging system or is attached as an additional unit to the delivery end.

8. The discharging system according to claim 1, wherein means for sensing the force, acting via the advancing rod on the pusher element, for discharging the compound is provided.

9. The discharging system according to claim 1, wherein the containers are disposable and the compounds do not contact the discharging system.

10. A discharging system for discharging liquid to pasty compound out of a cavity of at least one container, comprising:
- a delivery end at which the compound are discharged,
- a receiving unit for the at least one container,
- an advancing rod with a pusher element provided on the advancing rod adjacent the delivery end,
- a motor for linearly moving the advancing rod in order to discharge the compound from the delivery end,
- a monitoring unit for determining the volume of discharged compound,
- a measuring rod spaced from and arranged parallel to the advancing rod, the measuring rod connected to the advancing rod via a yoke-shaped connecting element in order to ensure simultaneous movement of the measuring rod upon movement of the advancing rod,
- a unit for measuring movement of the measuring rod to determine displacement of the advancing rod.

11. The discharging system of claim 10 wherein the container is removable from the discharging system and compound does not contact the system when it is being discharged.

12. The discharging system of claim 10 wherein the discharging system comprises a unit disposed adjacent the pusher to measure a diameter of the container.

\* \* \* \* \*